(12) United States Patent
Finkenzeller

(10) Patent No.: US 9,262,654 B2
(45) Date of Patent: Feb. 16, 2016

(54) READING DEVICE FOR CONTACTLESS COMMUNICATION WITH A TRANSPONDER UNIT

(75) Inventor: Klaus Finkenzeller, Unterfohring (DE)

(73) Assignee: GIESECKE & DEVRIENT GMBH, Munich (DE)

(*) Notice: Subject to any disclaimer, the term of this patent is extended or adjusted under 35 U.S.C. 154(b) by 178 days.

(21) Appl. No.: 14/114,874

(22) PCT Filed: Apr. 30, 2012

(86) PCT No.: PCT/EP2012/001863
§ 371 (c)(1),
(2), (4) Date: Oct. 30, 2013

(87) PCT Pub. No.: WO2012/150025
PCT Pub. Date: Nov. 8, 2012

(65) Prior Publication Data
US 2014/0055247 A1    Feb. 27, 2014

(30) Foreign Application Priority Data
May 3, 2011 (DE) .......................... 10 2011 100 296

(51) Int. Cl.
*H04Q 5/22* (2006.01)
*G06K 7/10* (2006.01)

(52) U.S. Cl.
CPC ........ *G06K 7/10257* (2013.01); *G06K 7/10128* (2013.01); *G06K 7/10267* (2013.01); *G06K 7/10336* (2013.01); *G06K 7/10356* (2013.01)

(58) Field of Classification Search
CPC .......... G06K 7/10336; G06K 1/10346; G06K 7/10356
USPC .......................................................... 340/10.5
See application file for complete search history.

(56) References Cited

U.S. PATENT DOCUMENTS

| | | | |
|---|---|---|---|
| 7,209,014 B2 | 4/2007 | Finkenzeller et al. |
| 7,837,119 B2 | 11/2010 | Graf et al. |
| 8,493,186 B2 | 7/2013 | Sugano et al. |
| 2004/0256460 A1 | 12/2004 | Charrat |
| 2005/0156752 A1 | 7/2005 | Finkenzeller et al. |

(Continued)

FOREIGN PATENT DOCUMENTS

| | | |
|---|---|---|
| CN | 1799058 A | 7/2006 |
| DE | 102004057266 A1 | 6/2006 |

(Continued)

OTHER PUBLICATIONS

European Search Report for corresponding PCT application PCT/EP2012/001863, mailed Jul. 24, 2012.

*Primary Examiner* — Steven Lim
*Assistant Examiner* — Omeed Alizada
(74) *Attorney, Agent, or Firm* — Workman Nydegger

(57) ABSTRACT

A reading device for contactless communication with a transponder unit includes a first antenna for generating a reading device field in the form of an alternating magnetic field. The reading device further contains one or more second antennas configured, and arranged in relation to the first antenna, such that during a contactless communication of the reading device with a transponder unit which generates communication signals by means of load modulation, a predetermined change of a detection signal is captured on the second antenna or antennas if the transponder unit is located in a predetermined zone around the reading device.

18 Claims, 5 Drawing Sheets

(56) References Cited

U.S. PATENT DOCUMENTS

| | | |
|---|---|---|
| 2005/0212673 A1 | 9/2005 | Forster |
| 2008/0061942 A1 | 3/2008 | Maniwa |
| 2009/0040022 A1 | 2/2009 | Finkenzeller |
| 2009/0243809 A1 | 10/2009 | Sugano et al. |
| 2012/0266221 A1* | 10/2012 | Castelluccia et al. ............. 726/6 |

FOREIGN PATENT DOCUMENTS

| | | |
|---|---|---|
| EP | 1901202 A2 | 3/2008 |
| EP | 2105862 A1 | 9/2009 |
| WO | 03069538 A1 | 8/2003 |
| WO | 2006000446 A1 | 1/2006 |
| WO | 2006056451 A1 | 6/2006 |

* cited by examiner

READING DEVICE FOR CONTACTLESS COMMUNICATION WITH A TRANSPONDER UNIT

BACKGROUND

This invention relates to a reading device for contactless communication with a transponder unit, and to a method for operating a reading device.

SUMMARY

Within the framework of contactless communication between a reading device and a transponder unit there is produced by the reading device an alternating magnetic field via which the reading device can transmit information to the transponder unit or a transponder unit can transfer information to the reading device. For information transfer from the transponder unit to the reading device, methods are known for passive and for active load modulation. In passive load modulation, the load of a transponder unit brought into the reading device field is changed, thereby leading to a modulation of the reading device field which can be detected via the reading device. No signal is thereby emitted actively by the transponder unit. In contrast, in active load modulation a transponder unit produces its own modulated field which serves for data transmission. The modulated field is configured here such that it can be evaluated by the reading device like the modulation of its own field in the case of a passive load modulation. The print WO 2006/000446 A1 describes the method of active load modulation in detail.

The print DE 10 2004 057 266 A1 describes a communication device for contactless communication with a transponder, wherein the communication device can be operated in a communication mode or in a detection mode. In the detection mode the presence of a transponder in a defined area is captured, whereas in the communication mode communication signals are emitted for communication with the transponder. In the detection mode detection signals with lower transmit power are emitted than the communication signals in the communication mode.

The document WO 03/069538 A1 shows a switching device which is actuated by a transponder. The switching device comprises an oscillating circuit by which the approach of a transponder is ascertained on the basis of a frequency change in the oscillating circuit.

By means of the above-described active load modulation the range of communication between reading device and transponder unit can be increased. However, this also opens up the possibility of attacks by which data are transmitted to a reading device over great distances via an accordingly strong alternating magnetic field and the reading device is tampered with.

The object of the invention is therefore to provide a reading device and a method for operating a reading device with which the just described attacks can be recognized.

This object is achieved by the reading device according to claim 1 and the method for operating a reading device according to claim 16. Developments of the invention are defined in the dependent claims.

The reading device according to the invention comprises a first antenna for generating a reading device field in the form of an alternating magnetic field via which a transponder unit can communicate by corresponding methods on the basis of active or passive load modulation. Besides said first transmitting antenna, the reading device further contains one or several second antennas which are configured, and arranged in relation to the first antenna, such that during a contactless communication of the reading device with a transponder unit which generates communication signals by means of (active or passive) load modulation, a predetermined change of a detection signal is captured on the second antenna or antennas if the transponder unit is located in a predetermined zone around the reading device. That is to say, upon a contactless communication already taking place with a transponder unit, the reading device according to the invention enables a determination of whether the transponder unit is located in the near zone around the reading device. The above phrase "predetermined change of a detection signal" is to be understood broadly and can in particular also comprise a change of the detection signal from a zero value to a non-zero value, which is synonymous with the measurement of a detection signal. The configuration of the second antenna or antennas relates according to the invention not only to their shape, but also to their switching between each other or in the reading device in order to thereby enable the capture of a detection signal.

The invention makes use of the finding that through a suitable arrangement of one or several second antennas there can be generated a detection signal from which it is determinable whether a transponder unit is located in proximity of the reading device. The change of the detection signal can be captured when a contactless communication is already being effected between reading device and transponder unit. If a change of the detection signal deviating from a predetermined change thereof occurs, it can be concluded that the communication is emanating from a transponder unit arranged remotely from the reading device, so that an attack by means of a transponder with high transmit power on the basis of active load modulation is present.

Depending on the configuration of the detection signal, the predetermined change of the detection signal via which the approach of a transponder unit within a predetermined zone around the reading device is ascertained can be configured differently. Preferably, the detection signal captured is a corresponding voltage signal or current signal. In a further variant, the predetermined change of the detection signal is characterized by a maximum value of the change of the detection signal. Should the change of the detection signal go beyond said maximum value, this can be rated as an attack of a transponder unit arranged remotely from the reading device.

The reading device according to the invention is preferably an NFC reading device (NFC=near field communication), the reading device being based in a preferred variant on the standard ISO/IEC 14443.

In a particularly preferred embodiment of the reading device according to the invention, the predetermined change of the detection signal is captured via the reading device field. This variant of the reading device has the advantage that, besides the reading device field employed for communication, no further field which is emitted e.g. at another frequency or another transmit power is required for detecting the presence of a transponder unit.

The predetermined zone in which the presence of a transponder unit is detected via the reading device according to the invention can be adapted depending on the case of application via corresponding design of the second antenna or antennas. As shown in FIG. 1 of the print WO 2006/000446 A1, an energy range and a communication range are established for a conventional reading device. The energy range here is the range for communication with a passive transponder without a dedicated energy supply, the energy for operating the transponder being made available in this case via the reading device field. In contrast, the communication range is the range in the case of communication of the reading device with an active transponder having a dedicated energy supply, where the reading device field does not have to make any energy available for operating the transponder. This range is greater than the energy range. Upon the employment of active load modulation, the energy range and communication range are extended accordingly. The predetermined zone of the reading device according to the invention in which the presence of a transponder is detected can be adapted to the just described communication ranges or energy ranges in a suitable manner In one embodiment, the predetermined zone is established such that it corresponds to the range which usually results upon the employment of active load modulation. In particular, the predetermined zone can also be adjusted such that it corresponds to the communication range or energy range of a reading device with or without load modulation at a normal antenna size of an active or passive transponder unit. The maximum normal antenna size here is in particular the antenna size for a transponder in the form of an ID1 card, which is approximately 4,000 mm$^2$.

In a preferred variant, the predetermined zone for which the reading device according to the invention detects the presence of a transponder is the zone up to a distance of 50 cm from the reading device or, where applicable, also the zone at a smaller distance, e.g. the zone up to a distance of 25 cm from the reading device. This zone corresponds to a conventional range of a communication between reading device and transponder unit while employing active load modulation. Nevertheless, there is also the possibility to establish the range such that it does not go beyond the range of a conventional communication purely on the basis of passive load modulation. In particular, the predetermined zone can be the zone up to a distance of 10 cm from the reading device or up to a smaller distance, preferably the zone up to a distance of 7 cm from the reading device. The last-mentioned distance is the conventional communication range between a reading device and a passive transponder in the form of an ID1 card.

In a particularly preferred embodiment, the reading device according to the invention is configured such that it interrupts a communication with a transponder unit when the predetermined change of a detection signal is not captured on the second antenna or antennas. In this way there is obtained an effective and fast protection against an attack by means of a tampered with transponder with high transmit power at a great distance from the reading device.

In a further embodiment of the reading device according to the invention, the first antenna is configured as a first conductor loop, and two second antennas are provided in the form of a pair of second conductor loops. The second conductor loops are arranged substantially coplanarly and in particular concentrically (i.e. with the same center) with the first conductor loop. Further, one of the second conductor loops is positioned around the first conductor loop, whereas the other of the second conductor loops is arranged inside the first conductor loop. Through the second conductor loops a voltage is induced due to the reading device field, the arrangement of the conductor loops being detuned by a transponder unit positioned in the predetermined zone, this in turn having an influence on the induced voltage and thus enabling the capture of a transponder unit in the near zone.

In a preferred variant of the just described embodiment, the respective diameters of the first and the second conductor loops are chosen such that the coupling factor between one second conductor loop and the first conductor loop is substantially just as great as the coupling factor between the first conductor loop and the other second conductor loop. As a result there can be obtained an arrangement in which the detection signal is set at zero when no transponder unit is brought into the predetermined zone around the reading device. Conversely, a deviation from this zero value occurs when a transponder unit is present in the predetermined zone.

In a further embodiment, the two second conductor loops of the reading device are connected in series out of phase, there being captured as a detection signal a voltage signal which is present on this series connection during operation of the reading device. Alternatively or additionally there is also the possibility that the two second conductor loops are connected in series in phase, there being captured as a detection signal a voltage signal which, during operation of the reading device, is present on a potentiometer between the two second conductor loops connected in series in phase. In the last-mentioned variant, the potentiometer can be employed for carrying out a zero adjustment by setting the potentiometer such that the voltage signal is zero when no transponder unit is located in the predetermined zone around the reading device.

In a further embodiment of the reading device according to the invention, the respective diameters of the first and the second conductor loops are chosen such that the coupling factor between one second conductor loop and the first conductor loop has a different value from the coupling factor between the first conductor loop and the other second conductor loop. Through the different choice of the diameters the reading device can be made more sensitive to an external field of an attacker, and thus attacks by means of active load modulation be captured more easily.

In a further embodiment of the reading device according to the invention, the first antenna is again configured as a first conductor loop, but there is now provided a single second antenna in the form of a second conductor loop. The second conductor loop is arranged substantially coplanarly with the first conductor loop such that the reading device field's magnetic flux running through the inner surface of the second conductor loop is neutralized for the total inner surface. In this variant, no voltage is induced in the second conductor loop via the reading device field, i.e. the second conductor loop cannot receive a signal from the first conductor loop. When a transponder is now brought into the predetermined zone around the reading device, there is again effected a detuning of the arrangement of conductor loops, which can be captured as a predetermined change of the detection signal. The just described arrangement has the advantage that only a single second antenna is required for capturing a transponder in the near zone.

The invention further comprises a method for operating a reading device which generates a reading device field in the form of an alternating magnetic field, the reading device capturing if a transponder unit is located in a predetermined zone around the reading device, and there taking place a contactless communication of the reading device with the transponder unit which generates communication signals by means of load modulation. In so doing, it is checked by the reading device simultaneously with the contactless communication whether the transponder unit is located in a predetermined zone around the reading device. The contactless communication is treated as impermissible when the check by the reading device yields that the transponder unit is located outside the predetermined zone around the reading device.

In a particularly preferred embodiment, the method is employed for operating the reading device according to the invention which generates the reading device field via its first antenna, a predetermined change of a detection signal being captured on the second antenna or antennas of the reading device during a communication of the reading device with the transponder unit if the transponder unit is located in the predetermined zone around the reading device.

In a further preferred embodiment of the method according to the invention, if the contactless communication is treated as impermissible, the communication with the transponder unit is aborted by the reading device and/or false data are communicated by the reading device to the transponder unit and/or an alarm is output by the reading device and/or an action coupled to the communication is prevented by the reading device. For example, an access is not enabled or goods are not issued.

BRIEF DESCRIPTION OF THE DRAWINGS

Exemplary embodiments of the invention will be described in detail hereinafter with reference to the attached figures.

There are shown.

DETAILED DESCRIPTION OF VARIOUS EMBODIMENTS

Hereinafter, embodiments of the invention will be described on the basis of a reading device for NFC communication with a transponder unit (hereinafter also referred to as a transponder) according to the standard ISO/IEC 14443. However, the invention is also applicable to other standards for NFC or near field communication. The reading devices explained hereinafter serve to detect an attack by means of active load modulation. As explained above, in active load modulation there is actively emitted by a transponder a modulated signal which is interpreted by the reading device like a reading device field passively modulated by the transponder. In passive load modulation the reading device field is modulated by connecting or disconnecting a load resistor in the transponder, without the transponder emitting a signal. Upon the employment of active load modulation there is the problem that a signal can be transmitted to the reading device over great distances by means of special transponders with very high transmit power and the reading device can thereby be tampered with by attackers. A corresponding attack scenario is rendered in FIG. 1.

Figure 1:
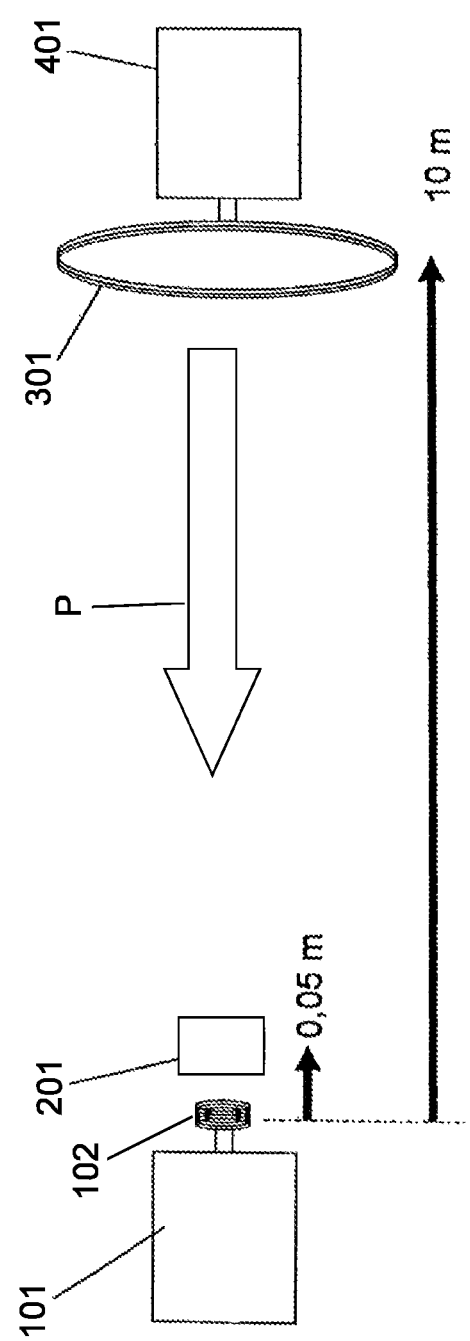
FIG. 1 a schematic representation which renders an attack on a contactless reading device by means of active load modulation.

FIG. 1 shows a conventional reading device 101 having a corresponding antenna 102. The reading device emits for communication with a transponder an alternating magnetic field with a carrier frequency of 13.56 MHz via the antenna 102. In proper operation the corresponding transponder 201 is located within a range of a few centimeters from the reading device and communicates with the reading device at this distance via active or passive load modulation. In passive load modulation with transponders without a dedicated energy supply the communication range is restricted by the energy range of the reading device field, because the energy supply of the transponder is effected via the field of the reading device.

With transponders having a dedicated energy supply the communication range between reading device and transponder is greater than the energy range. Upon the employment of active load modulation the communication range can be increased. Through the employment of a transponder with high transmit power, which is indicated in FIG. 1 by the processing unit 401 and an antenna 301 coupled therewith, an active load modulation can be feigned over distances of several meters via a corresponding simulation in the processing unit 401. The signal emitted by the antenna 301 for this purpose is indicated by the arrow P. With a transponder antenna 301, which has a diameter of about 1 meter, there can be achieved maximum transmit powers of 300 watts with which the represented range of 10 m can be obtained. According to FIG. 1 it is thus possible to increase the nominal read range of an ISO 14443 NFC system of 3-10 cm by more than a factor of 100, to thereby simulate a physically present transponder unit to a reading device from a great distance.

Figure 2:
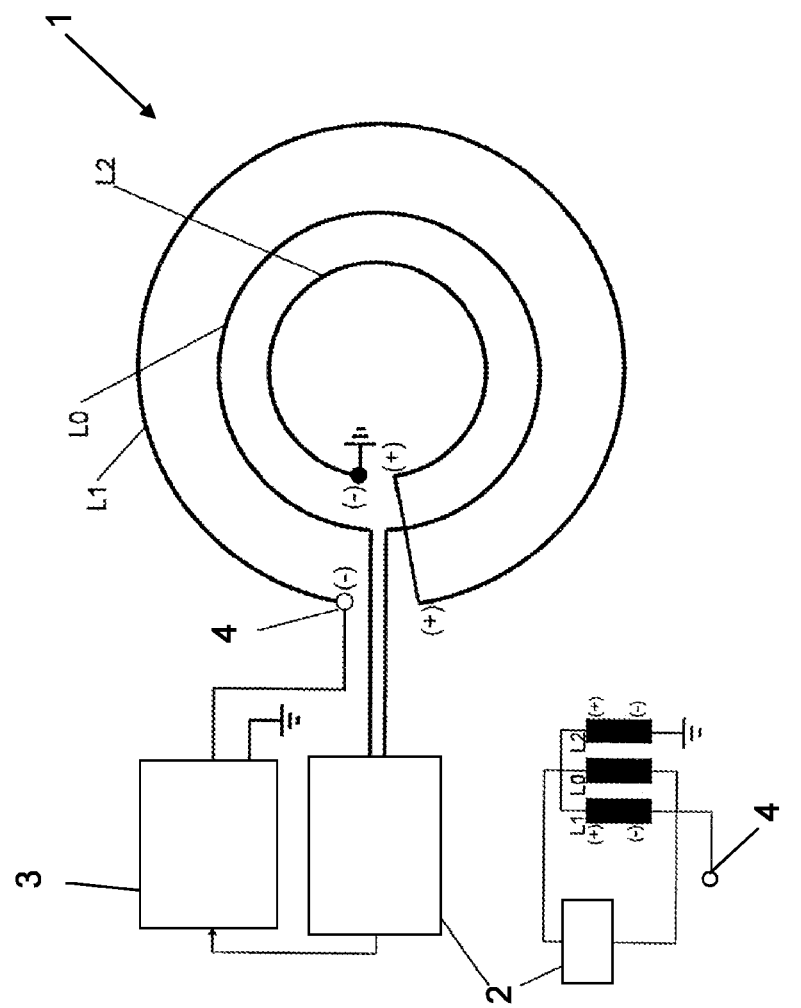
FIG. 2 a first embodiment of a reading device according to the invention for detection of an attack by means of active load modulation.
Figure 3:
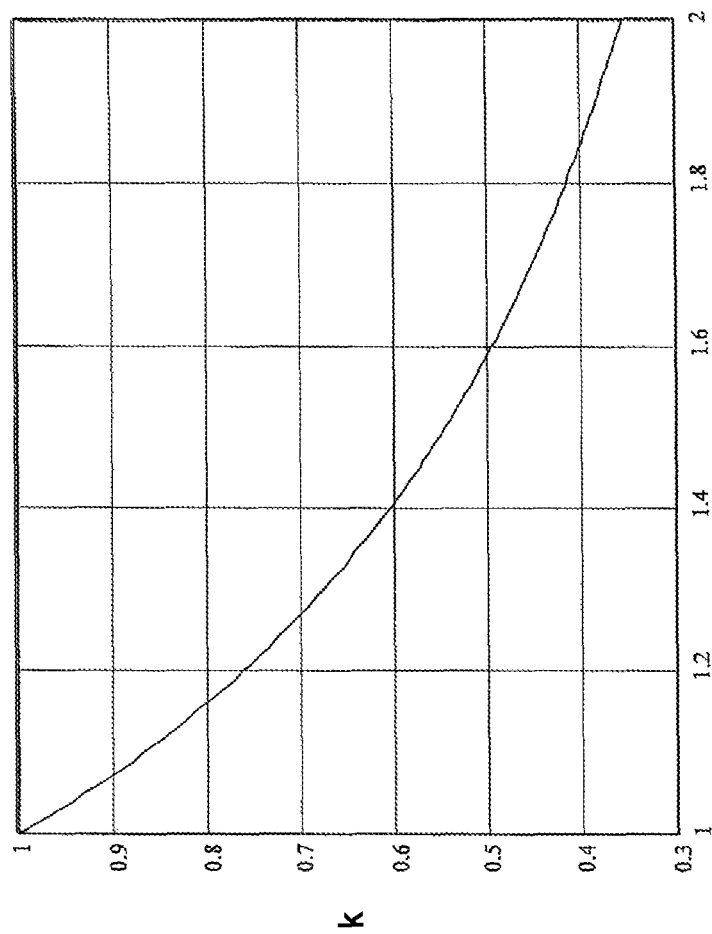
FIG. 3 a diagram which renders the change of the coupling factor between two conductor loops in dependence on their diameter ratio.

To make it possible to detect the attack described with reference to FIG. 1 there are employed, according to the invention, special configurations of a reading device which will be described hereinafter with reference to FIG. 2 to FIG. 5. FIG. 2 shows a first embodiment of a reading device according to the invention which is designated in its totality by the reference sign 1. The reading device comprises a processing unit 2 which produces signals for generating the alternating magnetic field of the reading device and which processes signals of the modulated reading device field. Conventionally, this processing unit is also designated a reader. Coupled to the reader is a transmitting antenna in the form of a conductor loop L0 via which the reading device field is emitted. For detection of a transponder unit in the near zone of the reading device there are also provided two further conductor loops L1 and L2 which are arranged coplanarly in the same plane as the conductor loop L0. The conductor loop L1 extends around the conductor loop L0, whereas the conductor loop L2 is arranged inside the conductor loop L0. The conductor loops L0, L1 and L2 are further positioned concentrically with each other, i.e. they all have the same center.

As results from a corresponding equivalent circuit diagram in the lower part of FIG. 2, the conductor loops L1 and L2 are switched out of phase and connected at the terminal 4 to a detection unit 3 via which the bringing of a transponder unit into a predetermined near range around the reading device is detectable and thus, conversely, in the presence of an actively modulated field which is generated by a transponder outside the near range an attack rendered in FIG. 1 can be inferred. The conductor loops L0, L1 and L2 have diameters which are chosen as follows:

$$D_{L1} > D_{L0} > D_{L2} \qquad (1)$$

$D_{L1}$ designates the diameter of the conductor loop L1, $D_{L0}$ the diameter of the conductor loop L0 and $D_{L2}$ the diameter of the conductor loop L2. The diameters $D_{L1}$ and $D_{L2}$ of the conductor loops L1 and L2 are moreover so chosen that the ratio to the diameter of the first conductor loop L0 is equal for both conductor loops L1 and L2, i.e. is as follows:

$$\frac{D_{L1}}{D_{L0}} = \frac{D_{L0}}{D_{L2}} \qquad (2)$$

This has the consequence that the same coupling factor $k = k_{10} = k_{20}$ comes about between the conductor loops L1 and L0 and between the conductor loops L0 and L2. The coupling factor k is a known quantity which describes the flux coupling of two conductor loops. The coupling factor is the smaller, the greater the difference is between the diameters of the conductor loops whose coupling is described by the coupling factor. This is illustrated by the diagram according to FIG. 3. Along the abscissa of this diagram there there is plotted the diameter ratio D1/D2 of two conductor loops, D1 always designating the greater diameter of the two conductor loops. Set against this along the ordinate there is rendered the coupling factor k. The coupling factor here lies between 0 and 1, the greatest possible coupling k=1 occurring at equal diameters D1 and D2. The greater the difference is between the diameters, the smaller the coupling factor becomes, with FIG. 3 rendering values of the coupling factor k for diameter ratios between 1 and 2 by way of example.

In the reading device of FIG. 2 there is detected on the terminal 4 the voltage present on the series connection of the conductor loops L1 and L2 which is produced due to induction via the reading device field of the conductor loop L0. Due to the above-described choice of the diameters and the out-of-phase switching of the conductor loops, the induced alternating voltage is equally great in the conductor loops L1 and L2, so that a voltage signal of zero is measured via the detection unit 3 if no transponder unit is located within range of the reading device 1. It is to be taken into consideration that an additional magnetic coupling $k_{21}$ that cannot be prevented also occurs between the conductor loops L1 and L2, which leads to the above-described diameter ratios not leading to a voltage of zero exactly, but only in very good approximation. Through corresponding slight adaptation of the diameters $D_{L1}$ and $D_{L2}$, however, the reading device according to FIG. 2 can nevertheless be adjusted such that the conductor loops L1 and L2 induce voltages of equal magnitude, so that exactly a voltage of zero is measured via the detection unit 3, if no transponder unit is located within range of the reading device.

With the reading device shown in FIG. 2, the presence of a transponder unit or an attack by means of active load modulation can now be detected. As mentioned above, in normal operation of the reading device where the antenna L0 emits an alternating magnetic field, an output voltage of approximately zero occurs on the terminal 4. If a transponder is now brought into the reading device field, this causes the arrangement of the conductor loops of the reading device to be detuned by an additional magnetic coupling with the transponder. As a result there is produced a (constant) output voltage on the terminal 4, which is clearly measurable and via which the presence of a transponder in direct proximity of the reading device can be inferred. The reading device is configured here such that when the reception of communication signals from the transponder is ascertained, a check of the output voltage on the terminal is effected. That is to say, during an ongoing contactless communication it is determined by the reading device whether the transponder is located in the near zone of the reading device, through which attacks by means of active load modulation can be inferred if no transponder can be detected in the near zone.

Depending on the case of application, it can be established through a suitable choice of the diameters or the diameter ratios of the individual conductor loops up to which distance from the reading device the presence of a transponder in the near zone is detectable. The distance is preferably chosen such that it lies within a conventional communication range or energy range of a reading device which exchanges data with a conventional transponder, e.g. in the form of an ID1 chip card. In particular, the distance can correspond to that communication range that results for active transponders having an energy supply, or having the functionality of an active load modulation. The distance can also be established for certain applications such that it does not go beyond a conventional communication range between a reading device and a passive transponder.

With the aid of the detection unit 3 it is thus ascertained that a transponder communicating with the reading device is located in a predetermined near range relative to the reading device when a predetermined voltage level is detected. If an attack by means of active load modulation is now effected by which an attacker generates a strong magnetic field from outside, this leads in the conductor loops L1 and L2 to clearly different voltages which differ from the output voltage which results when a transponder is brought into the predetermined near range around the reading device field. The voltages here are caused by the remote transmitting antenna of an attacker forming different coupling factors with the conductor loops L1 and L2. Therefore, an alternating magnetic field produced outside the reading device induces a clearly detectable field in the conductor loops L1 and L2. Via the detection unit 3 it can thus be ascertained whether a transponder is being brought into a predetermined zone around the reading device or whether an alternating magnetic field is being generated outside the predetermined zone. In the latter case it is inferred that an attack by an unauthorized third party is present, because at a great distance from the reading device an attempt is being made to take up a communication therewith. As a result the reading device can then prevent the communication with the attacker.

Figure 4:
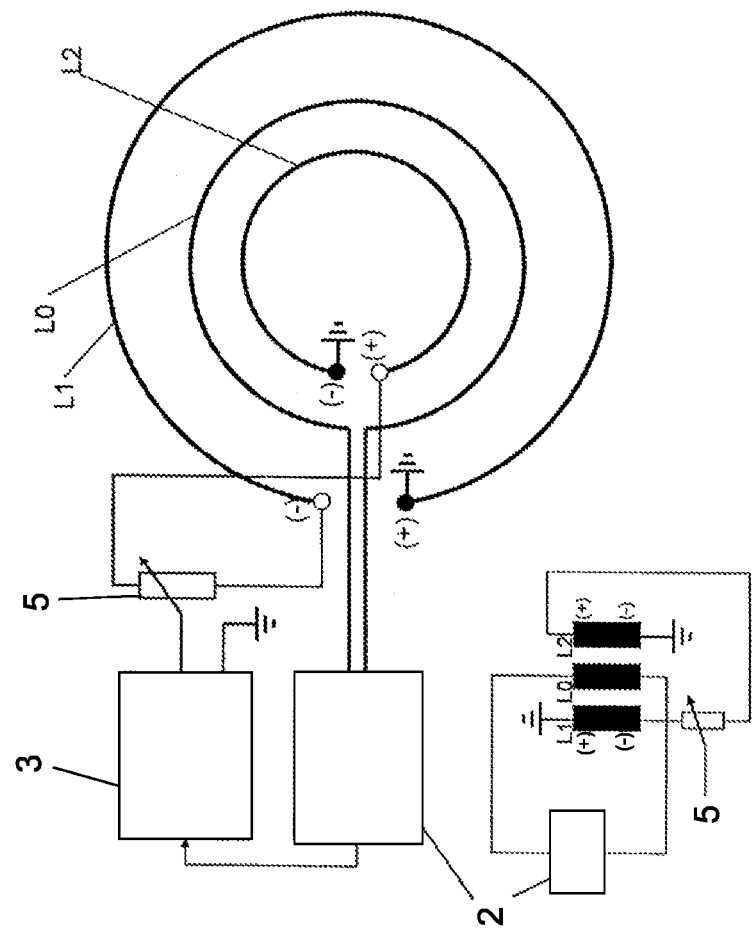
FIG. 4 a second embodiment of a reading device according to the invention for detection of an attack by means of active load modulation.

FIG. 4 shows a modification of the reading device of FIG. 2. Identical or corresponding components are designated with the same reference sign here. In analogy to FIG. 2, the reading device 1 of FIG. 4 again comprises the conductor loop L0 for emitting the reading device field as well as the conductor loops L1 and L2 arranged coplanarly and concentrically therewith. In a variant according to the invention, the diameters are chosen here as in FIG. 2 such that the coupling factor between the conductor loop L1 and the conductor loop L0 is just as great as the coupling factor between the conductor loop L0 and the conductor loop L2. In contrast to the embodiment of FIG. 2, however, the conductor loops L1 and L2 are now connected in series in phase, as is also indicated by the equivalent circuit diagram in the lower part of FIG. 4. Besides the reader 2 and the detection unit 3 there is further provided a potentiometer 5 which is arranged between the two conductor loops L1 and L2. Through the switching of the conductor loops L1 and L2 a negative and a positive voltage can be tapped which are approximately equal in magnitude if the voltages are induced by the reading device field produced via the conductor loop L0. By means of the potentiometer 5 a zero adjustment is now carried out, i.e. the voltage tap is set such that a voltage of zero is detected if no transponder is located in the accordingly defined predetermined zone around the reading device.

In analogy to the embodiment of FIG. 2, the bringing of a transponder into the predetermined near range around the reading device of FIG. 4 leads to a detuning of the arrangement of all conductor loops, so that a constant output voltage is captured via the detection unit 3. In contrast, a magnetic field coupled in from outside by means of active load modulation by a remote attacker induces clearly different voltages in the conductor loops L1 and L2, which differ from the constant output voltage resulting when a transponder is brought into the near zone of the reading device. Thus, it can be ascertained as in FIG. 2 whether a transponder is located in the near zone or whether an attack through a remote alternating magnetic field is present.

The advantage of the reading device according to FIG. 4 is that the induced voltages of the conductor loops L1 and L2 need not be equal in magnitude, because deviations can be compensated via the above-described zero adjustment by means of the potentiometer 5. Thus, the diameter ratios can, where applicable, also be chosen at variance with the condition introduced above according to which the coupling factors are equally great. In particular, the diameters of the conductor loops L1 and L2 can even be intentionally chosen to be at variance with the condition of equal coupling factors in order to make the arrangement more sensitive to an alternating magnetic field received from outside. For example, the diameter of the conductor loop L1 can be designed to be greater, or the diameter of the conductor loop L2 smaller, than would be stipulated according to the above equation (2).

Figure 5:
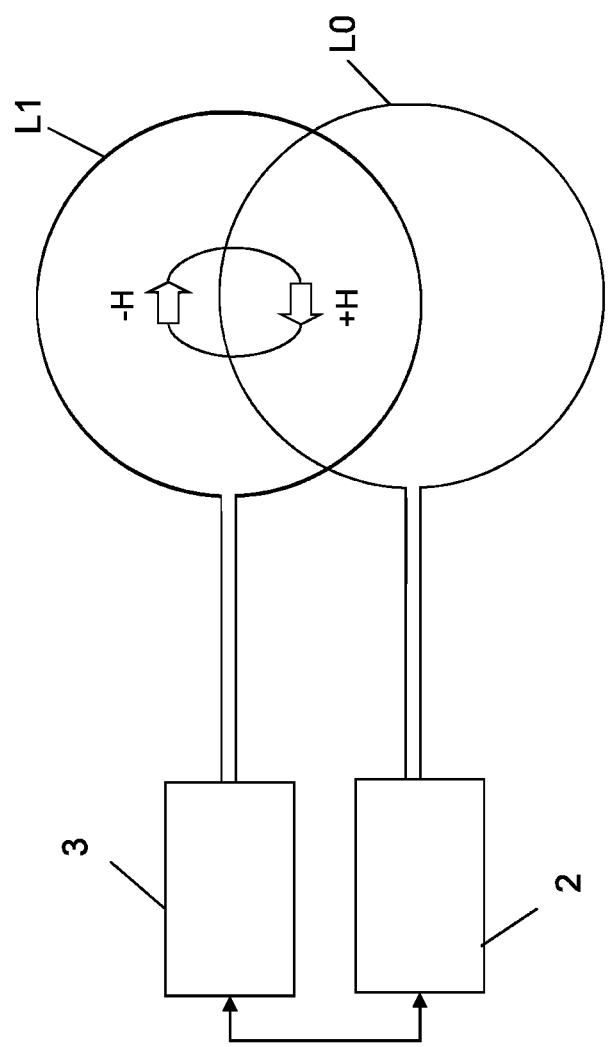
FIG. 5 a third embodiment of a reading device according to the invention for detection of an attack by means of active load modulation.

FIG. 5 shows a third embodiment of a reading device according to the invention. In analogy to the reading device according to FIG. 2 and FIG. 4, the reading device again comprises the reader 2 having an antenna in the form of a conductor loop L0. In contrast to the above embodiments, however, there is now provided a single additional conductor loop L1 which, in the embodiment of FIG. 5, has substantially the same diameter as the conductor loop L0.

In FIG. 5 the magnetic field lines of the reading device field inside and outside the conductor loop L0 are further indicated by +H and −H as well as corresponding arrows. The field lines extend in different directions inside and outside the conductor loop L0. In the reading device of FIG. 5, this finding is exploited such that the conductor loop L1 is so placed on the conductor loop L0 coplanarly that the magnetic flux $\Phi$ running through the inner surface of the conductor loop L1 is neutralized over the total inner surface. This has the consequence that a detection unit 3 which is connected to the conductor loop L1 and coupled to the reader 2 receives no signal if a conventional reading device field is generated and no transponder is located in proximity of the reading device.

In contrast, the arrangement of FIG. 5 is detuned when a transponder is brought into an accordingly defined predetermined zone around the reading device and an output signal is detected on the detection unit 3. A signal different therefrom is further produced when a magnetic field is coupled in from outside, by a remote attacker by means of active load modulation, because this magnetic field is formed largely homogeneously over the inner surface of the conductor loop L1 and thus induces in the conductor loop L1 a clearly measurable voltage, so that an attack by means of active load modulation can be detected without any problem.

As results from the above statements, the reading device according to the invention can capture that a transponder is located in the near zone of the reading device upon a communication with the reading device. This is due to the fact that a transponder physically brought into the reading device field leads to a detuning of the antenna arrangement of the reading device and thus to a slowly rising, low output voltage which can easily be observed. In contrast, an active load modulation from a great distance leads to a clearly measurable signal on the conductor loops L1, or L1 and L2, which differs from a classical load modulation signal. In particular, the amplitude, captured on the conductor loops L1, or L1 and L2, of an external load modulation signal which is produced remotely from the reading device is just as great as the amplitude of the signal detected via the conductor loop L0. In contrast, a passive load modulation signal of a passive transponder in direct proximity of the conductor loop L0 leads to a clear difference in the amplitudes.

The invention claimed is:

1. A reading device for contactless communication with a transponder unit, comprising:

a first antenna for generating a reading device field in the form of an alternating magnetic field;
    at least one second antenna,
    wherein the at least one second antenna is configured and arranged in relation to the first antenna such that simultaneously while performing contactless communication of the reading device via the first antenna with a transponder unit generating communication signals by means of load modulation, through the at least one second antenna a detection signal is generated,
    wherein the reading device is configured to determine a proximity of the transponder unit communicating with the reading device based on the detection signal, and, based on a determination of the proximity of the transponder unit, the reading device is configured to determine whether the transponder unit communicating with the reading device is an attacking device.

2. The reading device according to claim 1, wherein the detection signal is a voltage signal or current signal.

3. The reading device according to claim 1, wherein the reading device is configured to detect a change of the detection signal to determine the proximity of the transponder unit communicating with the reading device, wherein the change of the detection signal is characterized by a maximum value of the change of the detection signal.

4. The reading device according to claim 1, wherein the reading device is an NFC reading device on the basis of the standard ISO/IEC 14443.

5. The reading device according to claim 1, wherein the detection signal is captured via the reading device field.

6. The reading device according to claim 1, wherein the reading device is configured to determine whether the proximity of the transponder unit communicating with the reading device is within a distance of 25 cm from the reading device or less.

7. The reading device according to claim 1, wherein the reading device is configured to determine whether the proximity of the transponder unit communicating with the reading device is within a distance of 7 cm from the reading device or less.

8. The reading device according to claim 1, wherein, in the case that the reading device determines that the transponder unit communicating with the reading device is an attacking device, the reading device is configured to interrupt communication with the transponder unit.

9. The reading device according to claim 1, wherein the first antenna is configured as a first conductor loop, and the at least one second antenna includes two second antennas in the form of a pair of second conductor loops, the second conductor loops being arranged substantially coplanarly with the first conductor loop, and one of the second conductor loops being positioned around the first conductor loop, and the other of the second conductor loops inside the first conductor loop.

10. The reading device according to claim 9, wherein the respective diameters of the first and the second conductor loops are chosen such that the coupling factor between one second conductor loop and the first conductor loop is substantially just as great as the coupling factor between the first conductor loop and the other second conductor.

11. The reading device according to claim 9, wherein the two second conductor loops are connected in series out of phase, there being captured as the detection signal a voltage signal which is present on this series connection during operation of the reading device.

12. The reading device according to claim 9, wherein the two second conductor loops are connected in series in phase, there being captured as the detection signal a voltage signal which, during operation of the reading device, is present on a potentiometer between the two second conductor loops connected in series in phase.

13. The reading device according to claim 12, wherein the potentiometer is set such that the voltage signal is zero when no transponder unit is located in the predetermined zone.

14. The reading device according to claim 9, wherein the respective diameters of the first and the second conductor loops are chosen such that the coupling factor between one second conductor loop and the first conductor loop has a different value from the coupling factor between the first conductor loop and the other second conductor loop.

15. The reading device according to claim 1, wherein the first antenna is configured as a first conductor loop, and a second antenna in the form of a second conductor loop is provided, the second conductor loop being arranged substantially coplanarly with the first conductor loop such that the reading device field's magnetic flux running through the inner surface of the second conductor loop is neutralized over the total inner surface.

16. A method for operating a reading device, the method comprising the steps of:
   generating by the reading device a reading device field in the form of an alternating magnetic field;
   performing, by a first antenna of the reading device, contactless communication with a transponder unit by generating communication signals by means of load modulation;
   generating by a second antenna of the reading device a detection signal, the detection signal being generated by the second antenna and detected by the reading device simultaneously to the step of detection of performing contactless communication with the transponder unit by a first antenna of the reading device;
   determining, by the reading device, a proximity of the transponder unit communicating with the reading device based on the detection signal; and
   determining, by the reading device, whether the transponder unit communicating with the reading device is an attacking device based on a determination of the proximity of the transponder unit.

17. The method according to claim 16, wherein the first antenna generates the reading device field in the form of an alternating magnetic field, and
   wherein the second antenna is configured and arranged in relation to the first antenna such that during the contactless communication of the reading device via the first antenna with the transponder unit generating communication signals by means of load modulation, through the second antenna is generated the detection signal and a change of the detection signal is captured if the transponder unit is located within a distance from the reading device;
   wherein the method includes ascertaining that the transponder unit is located within the distance from the reading device in the checking step on the basis of the change of the detection signal of the second antenna.

18. The method according to claim 16, wherein in the case that the reading device determines that the transponder unit communicating with the reading device is an attacking device, the reading device is configured to interrupt communication with the transponder unit and/or communicates false data to the transponder unit and/or outputs an alarm and/or prevents an action coupled to the communication with the transponder unit.

* * * * *